United States Patent
He et al.

(10) Patent No.: US 12,430,221 B2
(45) Date of Patent: Sep. 30, 2025

(54) SYSTEMS AND METHODS FOR ESTIMATING INFORMATION HANDLING SYSTEM PERFORMANCE CAPACITY BASED ON TEMPERATURE AND ACOUSTIC PARAMETERS

(71) Applicant: Dell Products L.P., Round Rock, TX (US)

(72) Inventors: Qinghong He, Austin, TX (US); Balasingh Ponraj Samuel, Round Rock, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 17/969,046

(22) Filed: Oct. 19, 2022

(65) Prior Publication Data

US 2024/0134768 A1 Apr. 25, 2024
US 2024/0232037 A9 Jul. 11, 2024

(51) Int. Cl.
  *G06F 11/30* (2006.01)
(52) U.S. Cl.
  CPC ...... *G06F 11/3062* (2013.01); *G06F 11/3058* (2013.01)
(58) Field of Classification Search
  CPC ... G06F 1/206; G06F 11/3058; G06F 11/3062
  See application file for complete search history.

(56) References Cited

U.S. PATENT DOCUMENTS

| | | | | |
|---|---|---|---|---|
| 9,703,336 B2* | 7/2017 | Alton | | G06F 1/1632 |
| 10,698,457 B2* | 6/2020 | Lovicott | | G05D 23/1919 |
| 10,705,581 B2* | 7/2020 | La Monica | | G06F 1/3296 |
| 10,852,791 B2* | 12/2020 | Nielsen | | H05K 7/20836 |
| 11,199,886 B1* | 12/2021 | North | | G06F 1/3243 |
| 11,209,879 B2* | 12/2021 | He | | G06F 1/329 |
| 11,402,883 B2* | 8/2022 | Lin | | G06F 1/203 |
| 2018/0046172 A1* | 2/2018 | Tao | | G05D 1/0044 |
| 2021/0096623 A1* | 4/2021 | Rhinehart | | G06F 1/3296 |
| 2021/0149464 A1* | 5/2021 | Huang | | G05B 15/02 |
| 2022/0350667 A1* | 11/2022 | Vick | | G06F 1/324 |

OTHER PUBLICATIONS

"Overview of Human Thermal Responses to Warm Surfaces of Electronic Devices"—by Han Zhang and Alan Hedge; 9 Pages, Dated Sep. 2017 (Year: 2017).*

* cited by examiner

*Primary Examiner* — Brian T Misiura
(74) *Attorney, Agent, or Firm* — Jackson Walker L.L.P.

(57) ABSTRACT

An information handling system may include a processor and a program of instructions embodied in non-transitory computer-readable media, the program of instructions configured to, when read and executed by the processor: receive a touch temperature limit parameter indicative of a temperature limit; receive an acoustic noise limit parameter indicative of an acoustic noise limit; determine an estimated power capacity limit parameter indicative of an estimated power limit based on the touch temperature limit parameter and the acoustic noise limit parameter; and determine an estimated performance capability parameter based on the estimated power capacity limit parameter.

21 Claims, 2 Drawing Sheets

SYSTEMS AND METHODS FOR ESTIMATING INFORMATION HANDLING SYSTEM PERFORMANCE CAPACITY BASED ON TEMPERATURE AND ACOUSTIC PARAMETERS

TECHNICAL FIELD

The present disclosure relates in general to information handling systems, and more particularly to systems and methods for estimating performance capacity of an information handling system based on temperature and acoustic parameters.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. In addition, generation of heat in an information handling system may increase a skin temperature of an information handling system housing, which may be a particular concern for notebook, laptop, or other mobile devices which a user may hold or rest on the user's person. Accordingly, air movers (e.g., cooling fans and blowers) have often been used in information handling systems to cool information handling systems and their components. However, one disadvantage of existing approaches to thermal control of information handling systems is that oftentimes, air movers generate undesired acoustic noise that may be offensive to a user of the information handling system.

Some existing information handling systems may include power management utilities that allow a user to indicate a user's preference for skin temperature ("cool mode") and/or air mover noise level ("quiet mode"). While many users may be aware that setting an information handling system to operate at a cooler temperature or lower acoustic noise level, and in fact some power management utilities may communicate a generic notice to a user that operation at a cooler temperature and/or lower acoustic noise level may lead to decreased performance of the information handling system, existing power management utilities are unable to quantify an amount or degree by which performance may suffer. Accordingly, a user may worry that changing to a cooler temperature and/or lower acoustic noise level may cause too much performance degradation and thus may choose not to make such changes. Further, a user may change to a cooler temperature and/or lower acoustic noise level knowing a degradation in performance may occur, but experience a larger-than-expected performance degradation, leading to poor customer experience.

SUMMARY

In accordance with the teachings of the present disclosure, the disadvantages and problems associated with existing approaches to thermal and acoustical control in information handling systems may be substantially reduced or eliminated.

In accordance with embodiments of the present disclosure, an information handling system may include a processor and a program of instructions embodied in non-transitory computer-readable media, the program of instructions configured to, when read and executed by the processor: receive a touch temperature limit parameter indicative of a temperature limit; receive an acoustic noise limit parameter indicative of an acoustic noise limit; determine an estimated power capacity limit parameter indicative of an estimated power limit based on the touch temperature limit parameter and the acoustic noise limit parameter; and determine an estimated performance capability parameter based on the estimated power capacity limit parameter.

In accordance with these and other embodiments of the present disclosure, a method may include receiving a touch temperature limit parameter indicative of a temperature limit, receiving an acoustic noise limit parameter indicative of an acoustic noise limit, determining an estimated power capacity limit parameter indicative of an estimated power limit based on the touch temperature limit parameter and the acoustic noise limit parameter, and determining an estimated performance capability parameter based on the estimated power capacity limit parameter.

In accordance with these and other embodiments of the present disclosure, an article of manufacture, may include a non-transitory computer readable medium, computer-executable instructions carried on the computer readable medium, the instructions readable by a processor, the instructions, when read and executed, for causing the processor to, receive a touch temperature limit parameter indicative of a temperature limit; receive an acoustic noise limit parameter indicative of an acoustic noise limit; determine an estimated power capacity limit parameter indicative of an estimated power limit based on the touch temperature limit parameter and the acoustic noise limit parameter; and determine an estimated performance capability parameter based on the estimated power capacity limit parameter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
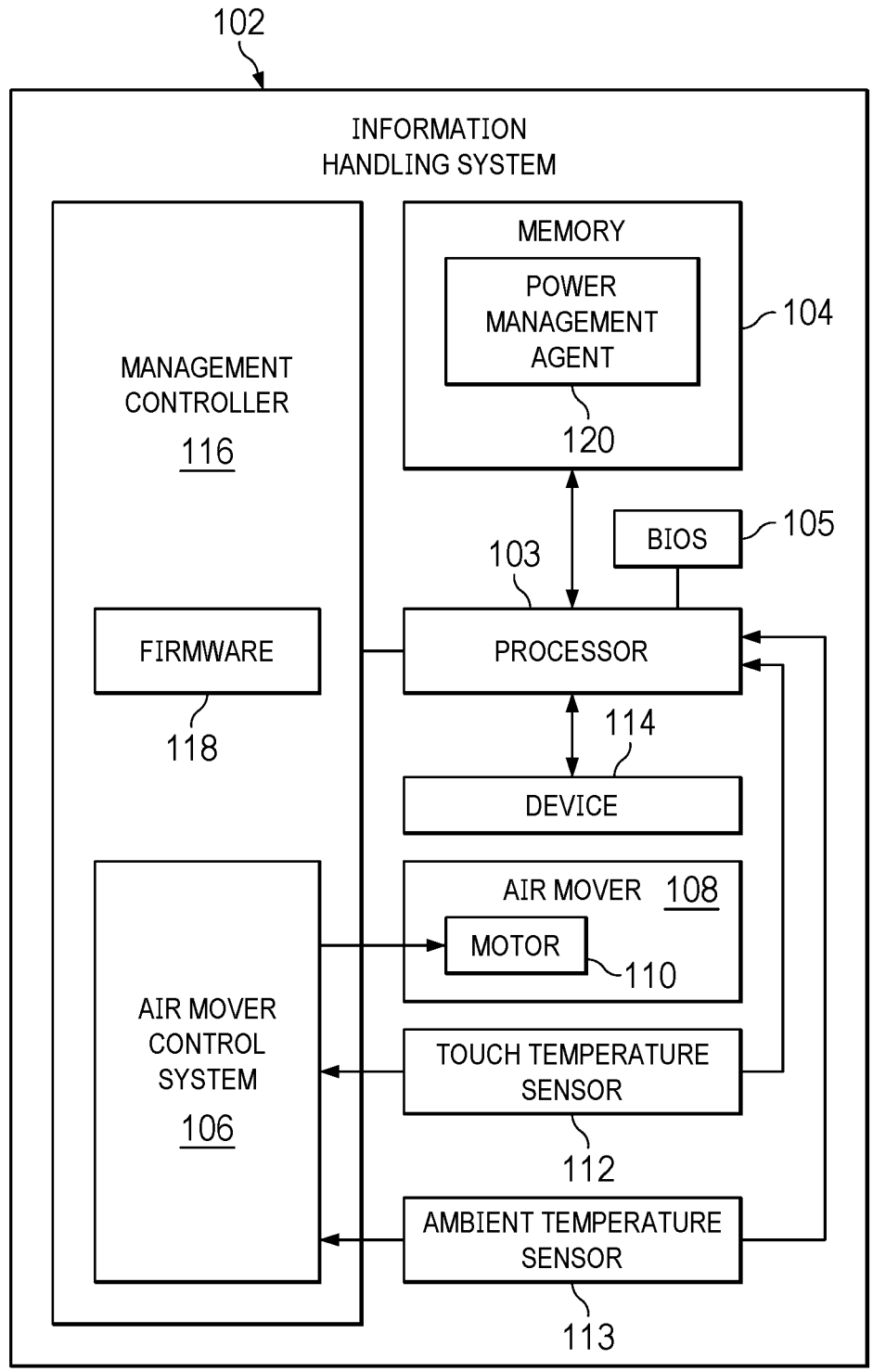
FIG. 1 illustrates a block diagram of an example information handling system, in accordance with embodiments of the present disclosure.
Figure 2:
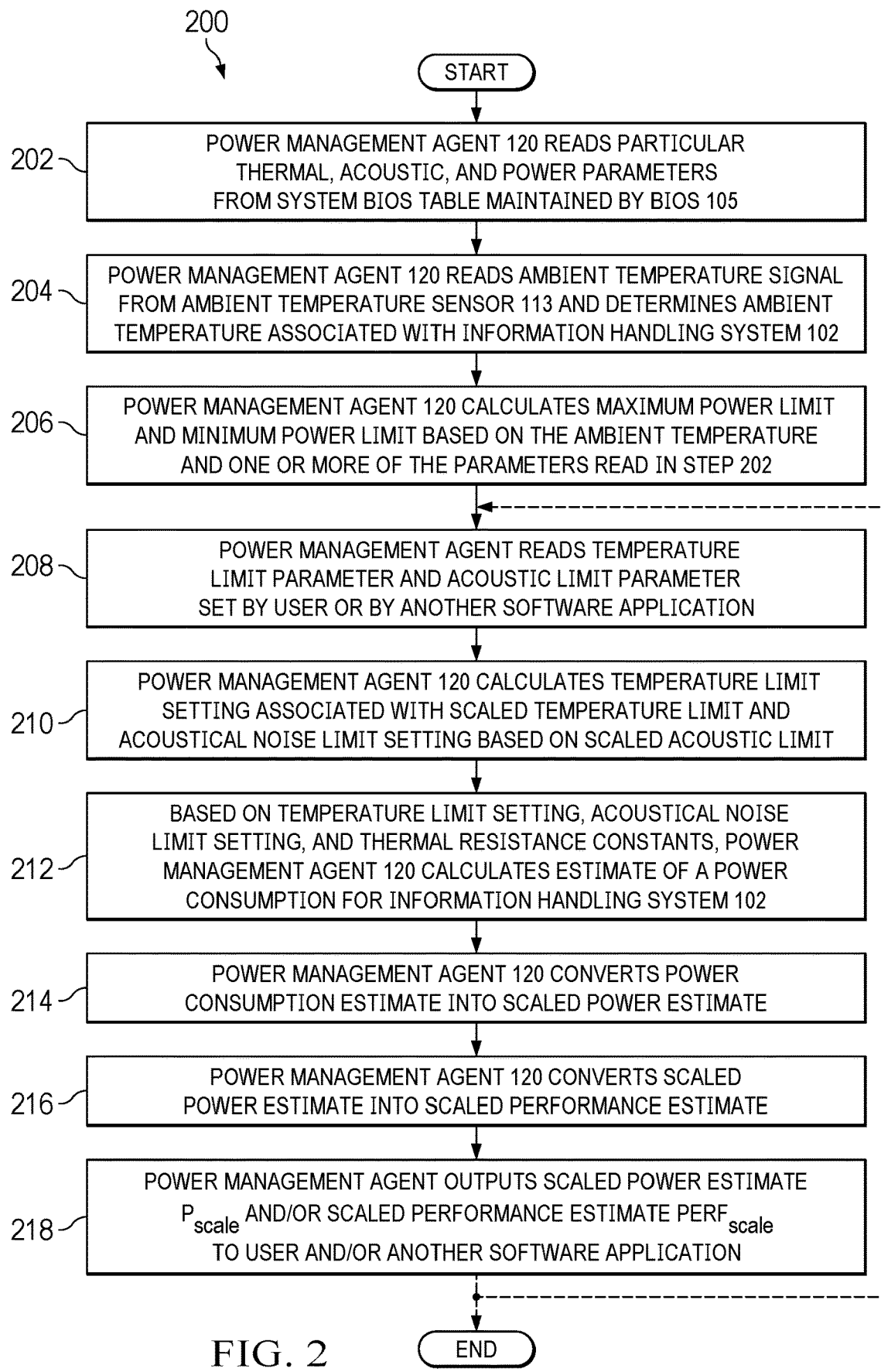
FIG. 2 illustrates a flow chart of an example method for estimating information handling system performance capacity based on temperature and acoustic parameters, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104 communicatively coupled to processor 103, a basic input/output system (BIOS) 105 communicatively coupled to processor 103, and an air mover 108 communicatively coupled to an air mover control system 106 (e.g., which may be implemented by a management controller 116), a touch temperature sensor 112 communicatively coupled to air mover control system 106 and/or processor 103, an ambient temperature sensor 113 communicatively coupled to air mover control system 106 and/or processor 103, one or more devices 114 communicatively coupled to processor 103, and a management controller 116 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a power management agent 120. Power management agent 120 may include one or more programs of instructions configured to, when read and executed by processor 103, perform power management operations of information handling system 102, including without limitation, estimating performance capacity of information handling system 102 based on temperature and acoustic parameters, as described in greater detail below. In some embodiments, power management agent 120 may be a component of an operating system of information handling system 102. In other embodiments, power management agent 120 may comprise a standalone application program or utility configured to execute on top of an information handling system 102.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heatsinks (not explicitly shown) internal to the enclosure to cool one or more information handling resources.

A touch temperature sensor 112 may be any system, device, or apparatus (e.g., a thermometer, thermistor, etc.) configured to communicate a signal to air mover control system 106 indicative of a "skin" or "touch" temperature indicative of a temperature present on an exterior of a housing of information handling system 102, thus indicating a temperature that might be felt by a user handling information handling system 102.

An ambient temperature sensor 113 may be any system, device, or apparatus (e.g., a thermometer, thermistor, etc.) configured to communicate a signal to air mover control system 106 indicative of a temperature of the ambient environment proximate to information handling system 102.

Device 114 may be communicatively coupled to processor 103 and may generally include any information handling resource.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118 and air mover control system 106. Firmware 118 may include a program of executable instructions configured to be read and executed by management controller 116 in order to carry out the functionality of management controller 116, including that functionality described herein.

Air mover control system 106 may include any system, device, or apparatus configured to receive one or more signals indicative of one or more temperatures within information handling system 102 (e.g., one or more signals from one or more temperature sensors 112, 113), and based on such one or more signals, determine an air mover driving signal to maintain an appropriate level of cooling, increase cooling, or decrease cooling, as appropriate, and communicate such air mover driving signal to air mover 108. Although FIG. 1 depicts air mover control system 106 integral to management controller 116, in some embodiments, air mover control system 106 may be external to and independent from management controller 116. In addition, although FIG. 1 depicts air mover control system 106 independent from firmware 118, in some embodiments, air mover control system 106 may be implemented within firmware 118.

For ease of exposition, FIG. 1 depicts only one each of air mover control system 106, air mover 108, touch temperature sensor 112, and ambient temperature sensor 113. However, it is noted that information handling system 102 may include two or more air movers 108 and each such air mover 108 may have a dedicated respective air mover control system 106. It is further noted that an air mover control system 106 and/or processor 103 may receive temperature signals from one or more temperature sensors in addition to or in lieu of touch temperature sensor 112 and ambient temperature sensor 113.

In operation, power management agent 120 may establish a relationship between performance capacity on one hand, and a temperature limit and acoustic limit on the other hand, wherein such temperature limit may be based on measurement data from testing of lab and/or factory testing of information handling system 102 or an information handling system substantially similar to information handling system 102. In some embodiments, the relationship may be a nonlinear relationship. Accordingly, power management agent 120 may be able to, in real time, estimate performance capacity and optionally output to a user (e.g., via a user interface of information handling system 102) a numerical value or other indicator of performance capacity based on temperature limit and acoustic limit settings configured by the user.

Thus, contrary to existing approaches that vaguely indicate that "reduced system performance" may occur due to lower settings of temperature limit and acoustic limit, using the systems and methods provided herein, power management agent 120 may be able to provide a user with an estimation of actual performance capacity ahead of time. Accordingly, a user or internal software components may learn, in real time, an exact performance capacity so that they may be better educated (for users) or be more optimized by artificial intelligence or machine learning (for software components) with the tradeoff among performance, temperature, and noise.

FIG. 2 illustrates a flow chart of an example method 200 for estimating information handling system performance capacity based on temperature and acoustic parameters, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, power management agent 120 may read particular thermal, acoustic, and power parameters from a system BIOS table maintained by BIOS 105. For example, such parameters may include, without limitation:

$T_{max}$—a maximum temperature sensed by a touch temperature sensor.

$T_{min}$—a minimum temperature sensed by the touch temperature sensor.

$Sone_{max}$—a maximum acoustical noise limit for noise generated by air mover 108.

$Sone_{min}$—a minimum acoustical noise limit for noise generated by air mover 108.

Thermal resistance constants determined by lab and/or factory testing of information handling system 102 (e.g., constants $C_1$, $C_2$, $C_3$, used below).

A scaling factor for scaling an estimated power to an estimated performance, which may be determined by lab and/or factory testing of information handling system 102 (e.g., scaling factor $C_4$, used below).

At step 204, power management agent 120 may read an ambient temperature signal from ambient temperature sensor 113 and based thereon, determine an ambient temperature $T_{amb}$ associated with information handling system 102.

At step 206, power management agent 120 may calculate a maximum power limit $P_{max}$ and a minimum power limit $P_{min}$ based on the ambient temperature and one or more of the parameters read in step 202. For example, maximum power limit $P_{max}$ and a minimum power limit $P_{min}$ may be given by:

$$P_{max} = \frac{T_{max} - T_{amb}}{C_1 + C_2 \cdot Sone_{max}^{-C_3}}$$

$$P_{min} = \frac{T_{amb} - T_{min}}{C_1 + C_2 \cdot Sone_{min}^{-C_3}}$$

At step 208, power management agent 120 may read a temperature limit parameter and an acoustic limit parameter set by a user (e.g., by the interfacing with power management agent 120) or by another software application. In some embodiments, rather than setting a particular temperature limit and/or acoustic limit, the temperature limit parameter and/or the acoustic limit parameter may be a scaled temperature limit $T_{scale}$ and/or a scaled acoustic limit $sone_{scale}$, ranging in integer values from 1 to N (e.g., N=5), that defines the temperature limit and/or acoustic limit in a user-friendly manner. For example, a $T_{scale}$ value of 1 may represent minimum temperature $T_{min}$, a $T_{scale}$ value of N may represent maximum temperature $T_{max}$, and a $T_{scale}$ value of (N+1)/2 (assuming N is an odd number) may represent a midpoint between minimum temperature $T_{min}$ and maximum temperature $T_{max}$. Likewise, a $sone_{scale}$ value of 1 may represent minimum acoustical noise limit $sone_{min}$, a $sone_{scale}$ value of N may represent maximum acoustical noise limit $sone_{max}$, and a $sone_{scale}$ value of (N+1)/2 (assuming N is an odd number) may represent a midpoint between minimum acoustical noise limit $sone_{min}$ and maximum acoustical noise limit $sone_{max}$.

At step 210, power management agent 120 may calculate a temperature limit setting $T_{setting}$ associated with scaled temperature limit $T_{scale}$, and an acoustical noise limit setting $sone_{setting}$ based on scaled acoustic limit $sone_{scale}$ as follows:

$$T_{setting} = (T_{scale} - 1)\frac{T_{max} - T_{min}}{N - 1} + T_{min}$$

$$sone_{setting} = (sone_{scale} - 1)\frac{sone_{max} - sone_{min}}{N - 1} + sone_{min}$$

At step 212, based on temperature limit setting $T_{setting}$, acoustical noise limit setting $sone_{setting}$, and thermal resistance constants $C_1$, $C_2$, and $C_3$, power management agent 120 may calculate an estimate of a power capacity $P_{estimate}$ for information handling system 102:

$$P_{estimate} = \frac{T_{setting} - T_{amb}}{C_1 + C_2 \cdot Sone_{setting}^{-C_3}}$$

At step 214, power management agent 120 may convert power capacity estimate $P_{estimate}$ into a scaled power estimate $P_{scale}$ in the range from 1 to N, as follows:

$$P_{scale} = \frac{P_{estimate} - P_{min}}{P_{max} - P_{min}} \cdot N + 1$$

At step 216, power management agent 120 may convert scaled power capacity estimate $P_{scale}$ into a scaled performance estimate $Perf_{scale}$ in the range from 1 to N, as follows:

$$Perf_{scale} = \left(\frac{P_{scale} - 1}{N}\right)^{C_4} \cdot N + 1$$

At step 218, power management agent 120 may output scaled power capacity estimate $P_{scale}$ and/or scaled performance estimate $Perf_{scale}$ to a user (e.g., via a graphical user interface of power management agent 120) and/or another software application.

After completion of step 218, method 200 may end or may return to step 208 in the event that one or both of scaled temperature limit $T_{scale}$ and scaled acoustic limit $sone_{scale}$ have changed.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a management controller 116, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a program of instructions embodied in non-transitory computer-readable media, the program of instructions configured to, when read and executed by the processor:
   receive a touch temperature limit parameter indicative of a temperature limit;
   receive an acoustic noise limit parameter indicative of an acoustic noise limit;
   calculate an estimated power capacity limit parameter indicative of an estimated power limit based on the touch temperature limit parameter and the acoustic noise limit parameter; and
   calculate an estimated performance capability parameter based on the estimated power capacity limit parameter.

2. The information handling system of claim 1, wherein the program of instructions is further configured to communicate at least one of the estimated power capacity limit parameter and the estimated performance capability parameter to at least one of a user of the information handling system and an application other than the program of instructions.

3. The information handling system of claim 1, wherein the program of instructions is further configured to receive an ambient temperature parameter indicative of an ambient environmental temperature proximate to the information handling system.

4. The information handling system of claim 1, wherein:
   the touch temperature limit parameter is a first scaled numerical value indicative of a desired temperature limit; and
   the acoustic noise limit parameter is a second scaled numerical value indicative of a desired acoustic noise limit.

5. The information handling system of claim 4, wherein the program of instructions is further configured to:
   convert the touch temperature limit parameter to the temperature limit;
   convert the acoustic noise limit parameter to the acoustic noise limit; and
   calculate the estimated power capacity limit parameter based on the temperature limit and the acoustic noise limit.

6. The information handling system of claim 1, wherein the estimated power capacity limit parameter is a first scaled numerical value indicative of the estimated power limit.

7. The information handling system of claim 6, wherein the program of instructions is configured to:
   calculate the estimated power limit based on the touch temperature limit parameter and the acoustic noise limit parameter; and
   convert the estimated power limit to the estimated power capacity limit parameter.

8. A method comprising:
   receiving a touch temperature limit parameter indicative of a temperature limit;
   receiving an acoustic noise limit parameter indicative of an acoustic noise limit;
   calculating an estimated power capacity limit parameter indicative of an estimated power limit based on the touch temperature limit parameter and the acoustic noise limit parameter; and
   calculating an estimated performance capability parameter based on the estimated power capacity limit parameter.

9. The method of claim 8, further comprising communicating at least one of the estimated power capacity limit parameter and the estimated performance capability parameter to at least one of a user of an information handling system and an application.

10. The method of claim 8, further comprising receiving an ambient temperature parameter indicative of an ambient environmental temperature proximate to an information handling system.

11. The method of claim 8, wherein:
the touch temperature limit parameter is a first scaled numerical value indicative of a desired temperature limit; and
the acoustic noise limit parameter is a second scaled numerical value indicative of a desired acoustic noise limit.

12. The method of claim 11, further comprising:
converting the touch temperature limit parameter to the temperature limit;
converting the acoustic noise limit parameter to the acoustic noise limit; and
calculating the estimated power capacity limit parameter based on the temperature limit and the acoustic noise limit.

13. The method of claim 8, wherein the estimated power capacity limit parameter is a first scaled numerical value indicative of the estimated power limit.

14. The method of claim 13, further comprising:
calculating the estimated power limit based on the touch temperature limit parameter and the acoustic noise limit parameter; and
converting the estimated power limit to the estimated power capacity limit parameter.

15. An article of manufacture, comprising;
a non-transitory computer readable medium; and
computer-executable instructions carried on the computer readable medium, the instructions readable by a processor, the instructions, when read and executed, for causing the processor to:
receive a touch temperature limit parameter indicative of a temperature limit;
receive an acoustic noise limit parameter indicative of an acoustic noise limit;
calculate an estimated power capacity limit parameter indicative of an estimated power limit based on the touch temperature limit parameter and the acoustic noise limit parameter; and
calculate an estimated performance capability parameter based on the estimated power capacity limit parameter.

16. The article of manufacture of claim 15, the instructions for further causing the processor to communicate at least one of the estimated power capacity limit parameter and the estimated performance capability parameter to at least one of a user of an information handling system and an application other than the instructions.

17. The article of manufacture of claim 15, the instructions for further causing the processor to receive an ambient temperature parameter indicative of an ambient environmental temperature proximate to an information handling system.

18. The article of manufacture of claim 15, wherein:
the touch temperature limit parameter is a first scaled numerical value indicative of a desired temperature limit; and
the acoustic noise limit parameter is a second scaled numerical value indicative of a desired acoustic noise limit.

19. The article of manufacture of claim 18, the instructions for further causing the processor to:
convert the touch temperature limit parameter to the temperature limit;
convert the acoustic noise limit parameter to the acoustic noise limit; and
calculate the estimated power capacity limit parameter based on the temperature limit and the acoustic noise limit.

20. The article of manufacture of claim 15, wherein the estimated power capacity limit parameter is a first scaled numerical value indicative of the estimated power limit.

21. The article of manufacture of claim 20, the instructions for further causing the processor to:
calculate the estimated power limit based on the touch temperature limit parameter and the acoustic noise limit parameter; and
convert the estimated power limit to the estimated power capacity limit parameter.

* * * * *